(12) United States Patent
Song (10) Patent No.: US 8,996,786 B2
(45) Date of Patent: Mar. 31, 2015

(54) NONVOLATILE MEMORY SYSTEM AND BLOCK MANAGEMENT METHOD

(75) Inventor: In Hwan Song, Incheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 633 days.

(21) Appl. No.: 13/338,984

(22) Filed: Dec. 28, 2011

(65) Prior Publication Data

US 2012/0198196 A1 Aug. 2, 2012

(30) Foreign Application Priority Data

Jan. 28, 2011 (KR) ........................ 10-2011-0009005

(51) Int. Cl.
*G06F 12/00* (2006.01)
*G06F 12/02* (2006.01)
(52) U.S. Cl.
CPC .... *G06F 12/0246* (2013.01); *G06F 2212/7211* (2013.01)
USPC .......................................... 711/103; 711/154
(58) Field of Classification Search
USPC ....................................................... 711/103
See application file for complete search history.

(56) References Cited

U.S. PATENT DOCUMENTS

| 2005/0114589 A1* | 5/2005 | Lofgren et al. ............... 711/103 |
| 2007/0150689 A1* | 6/2007 | Pandit et al. .................. 711/170 |
| 2008/0276038 A1* | 11/2008 | Tanaka et al. ................. 711/103 |

FOREIGN PATENT DOCUMENTS

| KR | 100857761 B1 | 9/2008 |
| KR | 1020100055201 A | 5/2010 |
| KR | 1020100091544 A | 8/2010 |
| KR | 1020110019227 A | 2/2011 |

* cited by examiner

*Primary Examiner* — Matthew Bradley
(74) *Attorney, Agent, or Firm* — William Park & Associates Patent Ltd.

(57) ABSTRACT

A nonvolatile memory system includes a memory area including a nonvolatile memory apparatus divided into a plurality of blocks, and a controller configured to control the memory area. The controller groups the plurality of blocks of the memory area according to wear level and whether each of the plurality of blocks is in use, and manages the blocks of each group in wear level order.

37 Claims, 5 Drawing Sheets

T1
approximate to wear
level limit: N
use: N

T2
approximate to wear
level limit: Y
use: N

T3
approximate to wear
level limit: N
use: Y

T4
approximate to wear
level limit: Y
use: Y

FIG.3

| Block Number | Forward Pointer | Backward Pointer | Difference in number of erasures | Etc |

FIG.4

| Maximum number of erasures | Total sum of differences in number of erasures | Total number of blocks | Etc |

NONVOLATILE MEMORY SYSTEM AND BLOCK MANAGEMENT METHOD

CROSS-REFERENCES TO RELATED APPLICATION

The present application claims priority under 35 U.S.C. §119(a) to Korean application number 10-2011-0009005 filed on Jan. 28, 2011 in the Korean Intellectual Property Office, which is incorporated by reference in its entirety.

BACKGROUND

1. Technical Field

The present invention relates to a memory system, and more particularly, to a nonvolatile memory system and a block management method.

2. Related Art

Since a nonvolatile memory apparatus, specifically, a flash memory apparatus, has advantages of low power consumption, miniaturization, and low heat generation, it has been employed for various multimedia appliances including mobile appliances.

In the flash memory apparatus, data is recorded in units of block, where an operation for erasing a corresponding block is performed before the data is recorded, and such an erase operation is generally performed in units of page. If the erase operation is performed over a predetermined number of times, the corresponding block may degrade so as not to be available for any more erase cycles.

In general, the number of erasures of a single-level cell is limited to a hundred thousand and the number of erasures of a multi-level cell is limited to ten thousand. If the number of erasures of a specific block gets approximately to or exceeds the predetermined number, it is highly probable that a bad block occurs due to deterioration, resulting in the reduction of the lifespan of a memory system.

Therefore, in a nonvolatile memory system, all blocks of a memory area are equally used in order to maximally extend the lifespan of a memory apparatus. This is referred to as wear-leveling.

The basic concept of the wear-leveling is to distribute the use of blocks by replacing a physical block indicated by a logical block number. According to the simplest method, all memory blocks are sequentially used and then the first memory block is used again. However, since this method requires much time for block movement and erasure, the operation performance of a memory system may be degraded. Furthermore, if the number of memory blocks is increased, since the number of erasures required for the wear-leveling is also increased, much time is required for selecting a replacement block.

SUMMARY

In one embodiment of the present invention, a nonvolatile memory system includes a memory area including a nonvolatile memory apparatus divided into a plurality of blocks, and a controller configured to control the memory area. The controller groups the plurality of blocks of the memory area according to wear level and whether each of the plurality of blocks is in use, and manages the blocks of each group in wear level order.

In another embodiment of the present invention, a block management method in a nonvolatile memory system includes categorizing each of a plurality of blocks, which are in a memory area of the nonvolatile memory system, into groups according to whether a wear level of each block is less than a predetermined wear level limit threshold value and whether each block is in use. The method may also comprise managing blocks in each group in a wear level order, where when a block is requested, the controller selects a block with a lowest number of erasures from blocks with a wear level less than the wear level limit threshold value, and outputs a number identifying the selected block.

In another embodiment of the present invention, a block management method in a nonvolatile memory system may include categorizing each of a plurality of blocks, which are in the nonvolatile memory system, into groups according to whether a wear level of each block is less than a predetermined wear level limit threshold value and whether each block is in use. The method may also include managing the blocks of each group in a wear level order, wherein, when a block with a specific wear level in a specific group is requested, a number identifying a selected block with the specific wear level, if available, is output, and a wear level in the specific group is rearranged to take into account absence of the selected block.

In another embodiment of the present invention, a block management method in a nonvolatile memory system may include categorizing each of a plurality of blocks, which are in the nonvolatile memory system, into groups according to whether a wear level of each block is less than a predetermined wear level limit threshold value and whether each block is in use. The method may also include managing blocks of each group in a wear level order, wherein, when addition of a block with a specific number of erasures in a specific group is requested, a wear level of the block to be added in the specific group is determined, and that information for the block to be added is taken into account in the specific group.

BRIEF DESCRIPTION OF THE DRAWINGS

Features, aspects, and embodiments are described in conjunction with the attached drawings.

DETAILED DESCRIPTION

A nonvolatile memory system and a block management method according to the present invention will be described in detail with reference to the accompanying drawings through various exemplary embodiments.

Figure 1:
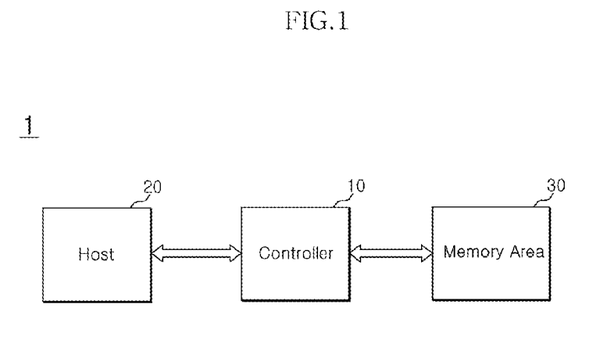
FIG. 1 is a configuration diagram of an exemplary nonvolatile memory system that may be used with an embodiment of the invention.

FIG. 1 is a configuration diagram of an exemplary nonvolatile memory system that may be used with an embodiment of the invention.

As illustrated in FIG. 1, a nonvolatile memory system 1 includes a controller 10, a host 20, and a memory area 30.

The host 20 is configured to transmit a control signal, an address signal, and the like to the controller 10, and transmit/receive data to/from the controller 10.

The controller 10 is configured to transmit/receive a control signal, an address signal, a data signal, and the like to/from the host 20. Furthermore, the controller 10 performs a file and directory management function, a wear-leveling function, and an address mapping function that may include a file system and software abstraction layer (flash translation layer; FTL). In addition, the controller 10 transmits a command, an address signal, and the like to the memory area 30, and transmits/receives data to/from the memory area 30.

The memory area 30 performs data record, erase, and read operations under the control of the controller 10. A nonvolatile memory apparatus constituting the memory area 30 may comprise, for example, flash memory.

The controller 10 divides each block of the memory area 30 into a plurality of tables according to the state of each block, and manages each block.

As well known in the art, a wear level of each block of a flash memory apparatus is gradually increased as program and erase operations are repeated. Thus, the wear level may be determined according to the current number of erasures with respect to the maximum number of erasures, and blocks may be grouped according to whether a wear level of each block is in a safe range. If the current number of erasures with respect to the maximum number of erasures is less than a predetermined wear level threshold value, for example, if a wear level is less than 90%, it may be determined that the wear level is still in a safe range. However, if the wear level is substantially equal to or larger than 90%, it may be determined that the wear level is not in a safe range.

In addition, each block of the memory apparatus is classified as a block in use (in which data has been recorded) or a block not in use (an empty block), and is managed by the controller 10.

Consequently, the controller 10 can group and manage blocks according to whether a wear level is in a safe range and whether the block is in use.

Figure 2:
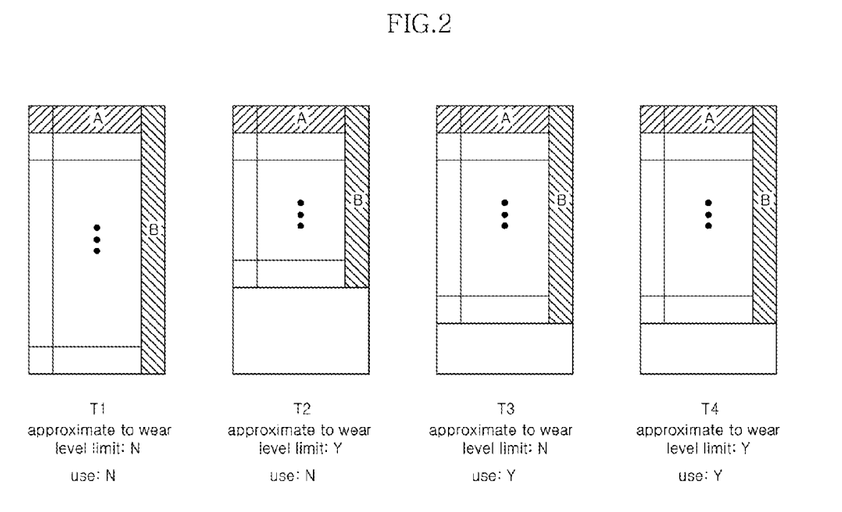
FIG. 2 is a diagram explaining an example of a block state management table applied to an embodiment of the invention.

FIG. 2 is a diagram explaining an example of a block state management table applied to an embodiment of the invention.

Referring to FIG. 2, the controller 10 manages blocks constituting the memory area 30 by using four tables.

A first table T1 represents a set of blocks with the wear level in a safe range and not in use. A second table T2 represents a set of blocks with the wear level not in a safe range and not in use. A third table T3 represents a set of blocks with the wear level in a safe range and in use, and a fourth table T4 represents a set of blocks with the wear level not in a safe range and in use.

The blocks included in each table may be arranged in a wear level order. Forward and backward pointers of each block may allow management of the blocks in the wear level order, and it may be possible to store the difference between the number of erasures of a block and the number of erasures of another block adjacent to the block in the wear level order. Such information may be stored in a block management information storage area A of each table. However, the invention is not limited thereto.

Figure 3:
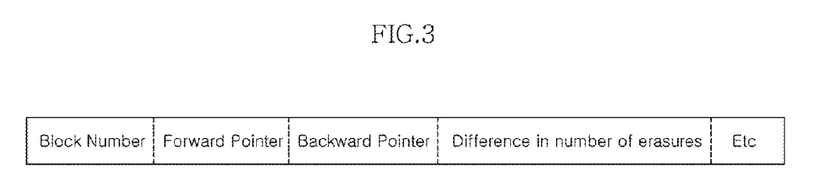
FIG. 3 is a diagram explaining an example of block management information according to an embodiment of the invention.

FIG. 3 is a diagram explaining an example of block management information according to an embodiment of the invention.

Each block management information storage area A may store block numbers, a forward pointer, a backward pointer, and difference of the number of erasures. Additional information may be stored as desired.

The block numbers are arranged in a wear level order, and may be arranged from the highest wear level (ranking 0) to the lowest wear level (ranking n).

Since the block numbers are arranged by the wear level order, the forward pointer indicates a block with the next higher wear level higher and the backward pointer indicates a block with a next lower wear level lower. The forward pointer of a block with the highest wear level may point to its own block, and the backward pointer of a block with the lowest wear level may point to its own block.

The difference of the number of erasures field may be the difference between the number of erasures of that block and the number of erasures of a block with a next higher wear level, or the difference between the number of erasures of that block and the number of erasures of a block with a next lower wear level.

In addition, each table may store the number of erasures of a block with the highest wear level among blocks belonging to that table, the total sum of the differences in the number of erasures of blocks belonging to that table, and the total number of blocks in that table. This information may be managed in a table management information storage area B of each table.

Figure 4:
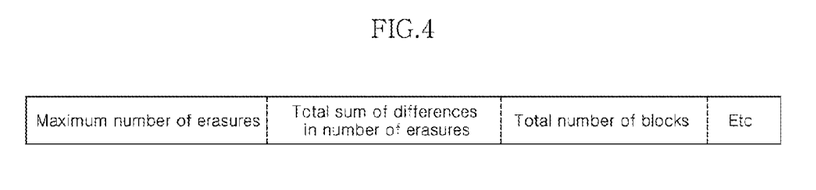
FIG. 4 is a diagram explaining an example of table management information according to an embodiment of the invention.

FIG. 4 is a diagram explaining an example of table management information according to an embodiment of the invention.

Referring to FIG. 4, the table management information storage area B may store the maximum number of erasures, the total sum of the differences in the number of erasures, the total number of blocks, and additional information. The maximum number of erasures indicates the number of erasures of a block with the highest wear level. The total sum of the differences in the number of erasures is determined from the differences in the number of erasures included in the block management information. The total number of blocks is counted by the number of blocks belonging to a corresponding table.

It may be possible to recognize the range of wear levels of blocks tracked by each table from the maximum number of erasures and the total sum of the differences in the number of erasures.

As described above, the blocks included in the memory area 30 are managed according to the wear levels and the use or non-use of the blocks, so that it is possible for the controller 10 to easily search for a block with a low wear level when an empty block is requested. When the empty block is requested, the controller 10 checks whether an empty block with a low wear level exists, and selects a block with the lowest number of erasures from blocks belonging to a group of blocks with a low wear level. When the selected block is in use, the controller 10 may copy the content of the selected block to another block, preferably, an empty block with a low wear level, and provide the selected block to equalize wear level. When the selected block is not in use, that block may be immediately provided as an empty block.

If the empty block with a low wear level does not exist, the controller 10 may select an empty block with the lowest number of erasures from blocks belonging to a group of blocks with a high wear level, and provide that as the selected empty block. Otherwise, the controller 10 may select an empty block with the lowest number of erasures from blocks belonging to a group of blocks with a high wear level, select a block with the lowest number of erasures from blocks belonging to a group of blocks with a low wear level, perform block replacement, and provide the block with the lowest number of erasures as the empty block.

This will be described in detail with reference to FIGS. 5 and 6 below.

Figure 5:
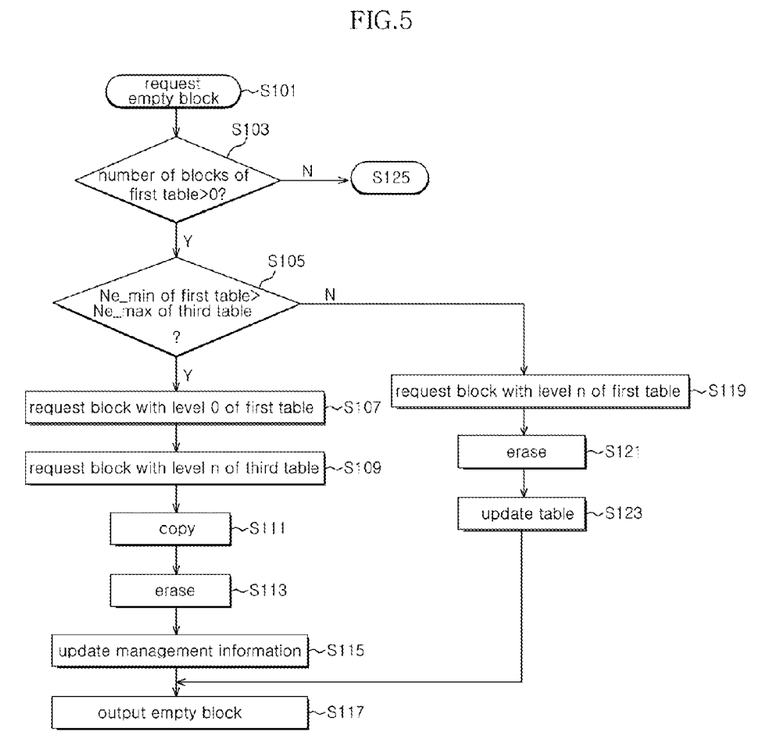
FIGS. 5 and 6 are exemplary flowcharts explaining a block management method according to an embodiment of the invention.
Figure 6:
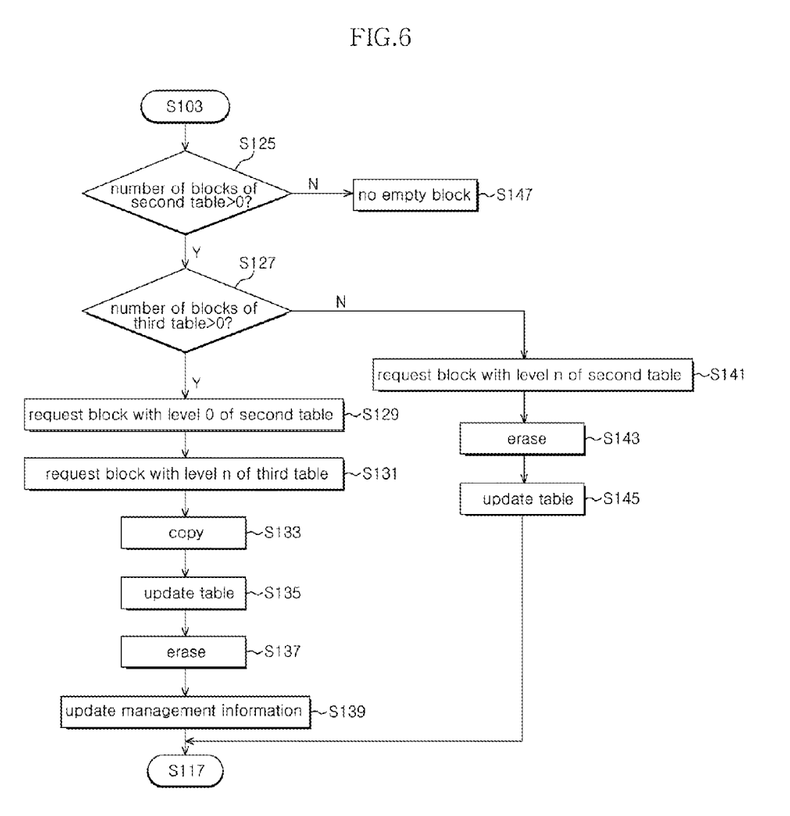

FIGS. 5 and 6 are flowcharts explaining a block management method according to an embodiment of the invention.

When an empty block is requested by the host 20, the controller 10 checks whether there exists a block registered in the first table T1 representing a set of blocks with wear level in the safe range and not in use (S103).

The controller 10 checks whether the maximum number (Ne_max) of erasures in the third table T3 representing a set of blocks with wear level in the safe range and in use is less than the minimum number (Ne_min) of erasures in the first table T1 (S105). That is, the controller 10 checks whether the number of erasures of a block with the lowest wear level in the first table is larger than the number of erasures of a block with the highest wear level in the third table, and compares the total wear level of blocks belonging to the first table with the total wear level of blocks belonging to the third table. According to another embodiment, when S105 is performed, an offset corresponding to a predetermined value α (a natural number) may be added to the maximum number (Ne_max) of erasures in the third table T3, and this number is compared with the minimum number (Ne_min) of erasures in the first table T1.

As a check result of S105, when the wear level in the first table is high, the number of a block with the highest wear level (the wear level is 0) is requested from the first table (S107). A process for outputting the number of a block with a specific wear level will be described later with reference to FIG. 7.

Meanwhile, a block number with the lowest wear level (the wear level is n) is requested from the third table (S109). This process may also be performed through the procedure of FIG. 7.

Then, with reference to the block number identifying a selected block, which is in use, in the third table, which is output from S109, the content of the corresponding block is copied into a block indicated by the block number identifying a block not in use in the first table, which is output from S107 (S111). The content of the block identified by the block number output from S109 is erased (S113). In this way, a block with the lowest wear level is selected.

With reference to a wear level and the number of erasures which are changed as the corresponding block is erased in step S113, management information is updated (S115) and a corresponding block number is output (S117).

In S115, as the block corresponding to the block number provided in S109 is erased, when a wear level of the block is in the not-safe range, the block is added to the fourth table. A process for adding a block with the specific number of erasures to a table will be described later with reference to FIG. 8.

When the wear level is still in the safe range after the block corresponding to the block number provided in S109 is erased, the block management information (for example, the blocks pointed to and a difference of the number of erasures) and the table management information (for example, the total sum of the differences in the number of erasures) are changed in the third table. This process may also be performed through the procedure of FIG. 8.

As a check result of S105, when the wear level in the first table is low, the output of the number of a block with the lowest wear level (the wear level is n) is requested from the first table (S119). If the number of the block with the lowest wear level is output, the controller 10 erases the content of the corresponding block (S121), updates the management information (S123), and outputs the number of the corresponding block (S117).

Figure 8:
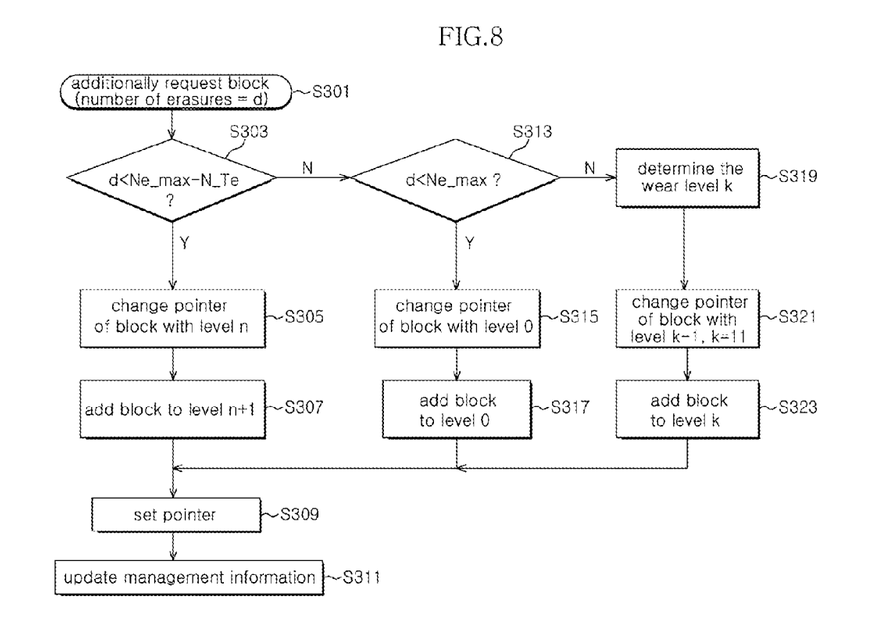
FIG. 8 is a flowchart explaining a block management method according to another embodiment of the invention.

In this case, since the state of the selected block is changed to "in use" when step S123 is performed, the block is added to the third table or the fourth table according to the wear level. This process may be performed as illustrated in FIG. 8.

In another embodiment, as a check result of step S103, when there are no blocks managed by the first table, a procedure as illustrated in FIG. 6 may be performed.

Referring to FIG. 6, when there are no blocks belonging to the first table, the controller 10 checks whether there are blocks belonging to another table that manages empty blocks, that is, the second table (S125).

As a check result of S125, if there are blocks belonging to the second table, the controller 10 checks whether there exists blocks belonging to the third table representing a set of blocks with a low wear level (S127). This process is for providing blocks with a low wear level through block replacement when blocks with a low wear level exist.

When there are the blocks belonging to the third table, the output of the number of a block with the lowest wear level is requested from the second table (S129), and the output of the number of a block with the lowest wear level is requested from the third table (S131).

The content of the block indicated by the block number output as a result of S131 is copied into the block (S133) indicated by the block number output as a result of S129. Thus, since the corresponding block has been changed to a block in use, information on the corresponding block is managed by the fourth table. That is, a process is performed to remove the information on the corresponding block from the second table and add the information on the corresponding block to the fourth table (S135).

The content of the block accessed in S131 is erased (S137), management information is changed (S139), and then the number of the corresponding block is output (S117). At this time, in consideration of a wear level and the number of erasures of the corresponding block changed as a result of S137, the block management information and the table management information may be changed in the third table, or the information on the corresponding block may be deleted from the third table and the information on the corresponding block may be added to the fourth table.

As a check result of S127, when there are no blocks belonging to the third table, a block (a block with a level n) with the lowest wear level is requested from the second table (S141), and the content of the corresponding block is erased (S143). Then, table information is updated according to the block erasure (S145) and the number of the corresponding block is output (S117). At this time, since the state of the corresponding block has been changed to a state "in use," a table update process may be performed through a process for deleting information on the corresponding block from the second table and adding the information on the corresponding block to the fourth table.

Meanwhile, as a check result of S125, when there are no blocks belonging to the second table, an alert message representing the absence of empty blocks is output (S147).

As described above, when the empty block is requested, the controller 10 of the embodiment selects a block with the lowest number of erasures from a group of blocks having not approximated to the wear level limit, and provides the selected block. At this time, since the blocks have been grouped according to whether a wear level is in a safe range and the blocks are in use, it is possible to reduce the time required for block search and equalize a wear level by uniformly using all blocks.

A process for outputting a block with a specific wear level from a table in a process for providing an empty block will be described with reference to FIG. 7.

The controller 10 provides a block number of a block with a wear level k from a specific table according to the request of the host 20, internal block replacement, and the like. When the block with a wear level k is requested, the controller 10 searches for the block with a wear level k and removes the corresponding block from a table. Then, the controller 10 changes block management information by changing forward and backward pointers for blocks before and after the block with a wear level k, and outputs the block number of the block with a wear level k. After outputting the block number, the controller 10 updates the table management information.

Figure 7:
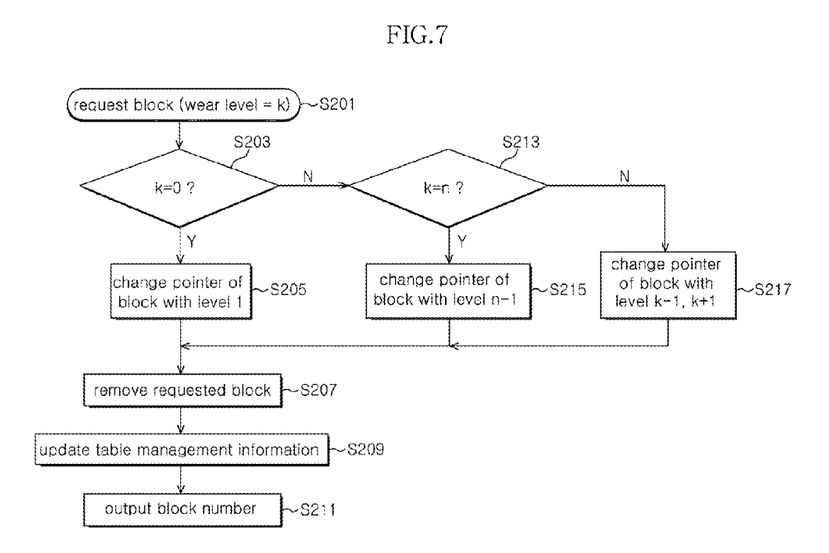
FIG. 7 is a flowchart explaining a block management method according to another embodiment of the invention.

FIG. 7 is a flowchart explaining a block management method according to another embodiment of the invention.

As the output of the number of a block with a wear level k is requested for a specific table (S201), the controller 10 checks whether the wear level k is 0, that is, a block with the highest wear level, has been requested (S203).

When the block with the highest wear level has been requested, the controller 10 changes a pointer with respect to a block with a second high wear level, that is, a block with a wear level 1 (S205). At this time, since the block with the highest wear level is to be removed and the block with a wear level 1 is to be managed as the block with the highest wear level, the controller 10 changes a forward pointer of the block with a wear level 1 to the block with a wear level 1. At this time, the difference in the number of erasures of the block with a wear level 1 may be changed.

Then, the controller 10 removes the requested block, that is, the block with a wear level 0 (S207), and changes the table management information (S209). For the table management information change (S209), information may be changed according to the removal of the block with a wear level k, that is, the maximum number of erasures, the total sum of the differences in the number of erasures, the total number of blocks, and the like are changed. The number of the block with a wear level k is output (S211).

As a check result of S203, when the block with the highest wear level has not been requested, the controller 10 determines whether a block with the lowest wear level has been requested, that is, a block with a wear level n has been requested (S213). As a determination result of S213, when the block with the lowest wear level has been requested, the controller 10 changes a pointer of a block with the next higher wear level than the corresponding block, that is, a block with a wear level n−1 (S215). That is, the controller 10 changes a backward pointer of the block with a wear level n−1 to the block with a wear level n−1. After the pointer is changed, the procedure proceeds to S207.

As a determination result of S213, when the wear level of the requested block is not the lowest wear level, the controller 10 searches for blocks corresponding to a wear level k by sequentially scanning a corresponding table.

Then, the controller 10 changes a pointer of a block (a block with a level k−1) with the next higher wear level than the wear level k and a pointer of a block (a block with a level k+1) with the next lower wear level than the wear level k (S217). In further detail, a backward pointer of the block with a level k−1 is changed to indicate the block with a level k+1 and a forward pointer of the block with a level k+1 is changed to indicate the block with a level k−1. After the pointers are changed, S209 is performed and subsequent steps are performed.

As described above, since the controller 10 of an embodiment manages blocks according to whether a wear level is in a safe range, when an empty block with a specific wear level has been requested, the empty block with a specific wear level is searched for from the first table or the second table at a high speed, so that a block number can be output.

As a nonvolatile memory system is repeatedly used, if an erase operation is performed for a specific block, the number of erasures, a wear level, and the like of the corresponding block are changed. As described in FIGS. 5 and 6, after the empty block is requested, a block with a wear level in a safe range and minimum number of erasures is provided. Since the number of erasures is changed, this change should be reflected in a table.

The number of erasures of a block is stored in each memory block as an erase operation is performed, and it is possible to manage the table according to the number of erasures.

In order to add a block with the number d of erasures to a table, a table to which the block is added is determined according to a wear level of a corresponding block and whether the corresponding block is in use. When the number of erasures of the block to be added is less than the number d of erasures of a block with the lowest wear level, the corresponding block is added as the block with the lowest wear level, and management information is changed by changing pointers and the like. If the number of erasures of the block to be added is larger than the number of erasures of a block with the highest wear level, the corresponding block is added as the block with the highest wear level, and the management information is changed.

If the number of erasures of the corresponding block is substantially equal to or larger than the number of erasures of the block with the lowest wear level and is substantially equal to or less than the number of erasures of the block with the highest wear level, a level to be added is determined and the management information is changed. When a block with the same number of erasures as the number of erasures of the block to be added exists in the table to be added, it is preferable to set the wear level of the block to be added to be lower than the block already in the table.

This will be described with reference to FIG. 8 below.

FIG. 8 is a flowchart explaining a block management method according to further another embodiment.

When the addition of a block with a d number of erasures is requested (S301), the controller 10 determines a table to be added according to a wear level of a block to be added and whether that block is in use.

Next, the controller 10 checks whether the difference between the maximum number Ne_max of erasures of the table to be added and the total sum N_Te of the differences in the number of erasures is larger than the number d of erasures of the requested block (S303).

As a check result of S303, when the difference between the maximum number Ne_max of erasures of the table to be added and the total sum N_Te of the differences in the number of erasures is larger than the number d of erasures of the requested block, the controller 10 determines that a wear level of the block to be added is the lowest level, changes a pointer of a block with the lowest wear level n in the current table (S305), and adds the corresponding block to the lowest level n+1 (S307). In the case of changing a pointer of a block with a level n, a backward pointer having indicated the block with a level n is changed to indicate the number of the block added to the level n+1.

Then, the controller 10 sets a pointer of the block added to the level n+1 (S309), and changes the management information (S311). The pointer of the block added to the level n+1 is set such that a forward pointer indicates the block with a level n and a backward pointer indicates the block added to the level n+1. In addition, in the management information update, the block management information including the differences in the number of erasures, the table management information including the total sum of the differences in the number of erasures, and the total number of blocks are changed.

As a check result of S303, when the difference between the maximum number Ne_max of erasures of the table to be added and the total sum N_Te of the differences in the number of erasures is less than the number d of erasures of the requested block, the controller 10 checks whether the number d of erasures of the requested block is less than the maximum number Ne_max of erasures in the corresponding table (S313).

As a check result of S313, when the number of erasures of the requested block is less than the maximum number Ne_max of erasures, the controller 10 regards the requested block as a block with the highest wear level, and changes a pointer of a block currently managed to a level 0 (S315). That is, a forward pointer of the block with a level 0 is changed to indicate the number of a block to be added.

In addition, the controller 10 adds the corresponding block as a block with the highest wear level (ranking 0) (S317), and the procedure proceeds to S309. In this case, the pointer of the added block is set in such a manner that a forward pointer is changed to indicate the added block and a backward pointer is changed to indicate the number of the block with a level 0. Moreover, in the management information update S311, the maximum number of erasures, the total sum of the differences in the number of erasures, the total number of blocks, and the like are changed.

As a check result of S303 and S313, when the wear level of the block to be added is not the lowest level or the highest level, the controller 10 adds the corresponding block to a wear level k.

To this end, the controller 10 determines the wear level k to be added by scanning a table with reference to the number of erasures of the block to be added and the difference in the number of erasures in the table (S319).

If the wear level is determined, the controller 10 sets again a pointer of a block with a wear level k−1 and a pointer of a block with a wear level k (S321). Then, the controller 10 adds the corresponding block to the level k (S323) and the procedure proceeds to S309.

In step S321, the backward pointer of the block with a wear level k−1 indicates the number of the newly added block. Furthermore, the forward pointer of the block with a wear level k indicates the number of the newly added block.

In S309, the forward pointer of the newly added block with a level k indicates the number of the block with a wear level k−1, and the backward pointer of the newly added block with a level k indicates the number of the block with a wear level k. In addition, the management information is updated (S311) with the block management information including the differences in the number of erasures, the table management information including the total sum of the differences in the number of erasures and the total number of blocks.

In the nonvolatile memory system of the embodiment, the controller 10 groups blocks according to whether the wear level of each block is in a safe range and is in use, and arranges and manages block numbers in each group in a wear level order.

Thus, when an empty block is requested, it is possible to search for blocks with the wear level in a safe range and the lowest number of erasures at a high speed, and provide the searched blocks. When blocks to be provided are in use, block replacement and the like should be performed. In this case, blocks with a low wear level are preferentially selected and block replacement is performed. Moreover, when such a process is performed, since blocks have been arranged in a corresponding group in a wear level order, it is possible to search for a desired block at a high speed.

Furthermore, if empty blocks are provided and an erase operation is performed, the number of erasures of the corresponding blocks is changed, resulting in a change in a wear level. As the wear level and the number of erasures are changed, the corresponding blocks may be added to a table, and blocks are added in a wear level order according to the number of erasures of blocks to be added.

As a consequence, blocks are grouped according to wear level and the use or non-use of the blocks, and are managed in a wear level order. This makes it possible to equalize wear level and significantly reduce the time required for wear-leveling.

While certain embodiments have been described above, it will be understood to those skilled in the art that the embodiments described are by way of example only. Accordingly, the nonvolatile memory system and the block management method described herein should not be limited based on the described embodiments. Rather, the nonvolatile memory system and the block management method described herein should only be limited in light of the claims that follow when taken in conjunction with the above description and accompanying drawings.

What is claimed:

1. A nonvolatile memory system comprising:
a memory area including a plurality of blocks; and
a controller configured to control the memory area,
wherein the controller groups the plurality of blocks of the memory area according to whether a wear level of each block is less than a predetermined wear level limit threshold value and whether each of the plurality of blocks is in use, and manages blocks of each group in wear level order,
and the controller includes a plurality of tables including a first table of blocks having a wear level less than the predetermined wear level limit threshold value and are not in use, a second table including blocks having a wear level greater than or equal to the predetermined wear level limit threshold value and are not in use, a third table including blocks having a wear level less than the predetermined wear level limit threshold value and are in use, and a fourth table including blocks having a wear level greater than or equal to the predetermined wear level limit threshold value and are in use.

2. The nonvolatile memory system according to claim 1, wherein the controller is configured to determine the wear level according to a number of erasures with respect to a maximum number of erasures.

3. The nonvolatile memory system according to claim 1, wherein each of the plurality of tables stores as block management information a block number registered in a table, a pointer indicating a number of an adjacent block in a wear level order, and differences in a number of erasures with respect to the adjacent block in the wear level order.

4. The nonvolatile memory system according to claim 3, wherein the pointer includes a forward pointer indicating a block having a next higher wear level, and a backward pointer indicating a block having a next lower wear level.

5. The nonvolatile memory system according to claim 3, wherein each of the plurality of tables stores as table management information a block maximum number of erasures determined as a number of erasures of a bock with a highest wear level, a total sum of differences in the number of erasures, and a total number of blocks registered in the table.

6. The nonvolatile memory system according to claim 5, wherein, in a case where a block not in use is requested, when there exists a block registered in the first table, the controller selects a block with a lowest number of erasures from blocks registered in the first and third tables, and provides the selected block.

7. The nonvolatile memory system according to claim 5, wherein, in a case where a block not in use is requested, when there exists no block registered in the first table and there exists a block registered in the second and third tables, the controller selects a block with a lowest number of erasures from blocks registered in the third table, and provides the selected block.

8. The nonvolatile memory system according to claim 5, wherein, in a case where a block not in use is requested, when there exists no block registered in the first and third tables and there exists a block registered in the second table, the controller selects a block with a lowest number of erasures from blocks registered in the second table, and provides the selected block.

9. The nonvolatile memory system according to claim 5, wherein, when a block with a specific wear level is requested, the controller selects the block in a table with the specific wear level, and updates the block management information and the table management information for that table.

10. The nonvolatile memory system according to claim 9, wherein, when output of a block with a highest wear level is requested, the controller changes the block management information of a block with a second highest wear level, and changes the table management information.

11. The nonvolatile memory system according to claim 9, wherein, when output of a block with a lowest wear level is requested, the controller changes the block management information of a block with a second lowest wear level, and changes the table management information.

12. The nonvolatile memory system according to claim 9, wherein, when the wear level of the requested block is not the highest wear level nor the lowest wear level, the controller searches for a block with the requested wear level by scanning a corresponding table based on the difference in the number of erasures, changes block management information of a block with a wear level adjacent to the selected block, and changes the table management information.

13. The nonvolatile memory system according to claim 5, wherein, when addition of a block with a specific number of erasures is requested for one of the plurality of tables, the controller adds the block with the specific number of erasures with reference to a difference between a maximum number of erasures and a number of erasures, and a total sum of differences in the number of erasures in a corresponding table.

14. The nonvolatile memory system according to claim 13, wherein, when the difference between the maximum number of erasures and the total sum of differences in the number of erasures in the corresponding table is larger than a number of erasures of a block to be added, the controller adds the block with the specific number of erasures as a block with a lowest wear level.

15. The nonvolatile memory system according to claim 14, wherein the controller changes a pointer of the block with a lowest wear level before the block is added, sets a pointer of the added block, and updates the table management information.

16. The nonvolatile memory system according to claim 13, wherein, when the difference between the maximum number of erasures and the total sum of differences in the number of erasures in the corresponding table is equal to or less than the number of erasures of the block with the specific number of erasures, if the number of erasures of the block to be added is larger than the maximum number of erasures in the corresponding table, the controller adds the block with the specific number of erasures as a block with a highest wear level.

17. The nonvolatile memory system according to claim 16, wherein the controller changes a pointer of the block with a highest wear level before the block with the specific number of erasures is added, sets a pointer of the added block, and updates the table management information.

18. The nonvolatile memory system according to claim 16, wherein, if the number of erasures of the block with the specific number of erasures is equal to or less than the maximum number of erasures in the corresponding table, the controller determines a wear level of the block with the specific number of erasures based on the difference in the number of erasures, changes a pointer of a block before and after the determined level, sets a pointer of the added block, and updates the table management information.

19. A block management method in a nonvolatile memory system comprising:
categorizing each of a plurality of blocks, which are in a memory area of the nonvolatile memory system, into groups according to whether a wear level of each block is less than a predetermined wear level limit threshold value and whether each block is in use; and
managing blocks in each group in a wear level order, wherein, when an empty block is requested, and when a group with a wear level less than the predetermined wear level limit threshold value include at least one block not in use, a block with a lowest number of erasures from blocks with a wear level less than the predetermined wear level limit threshold value is selected, and a block number identifying the selected block is output.

20. The block management method according to claim 19, wherein when the selected block is in use, contents of the selected block is copied to a block not in use among the blocks in the group of the blocks with a wear level less than the predetermined wear level limit threshold value, erases the selected block, and the block number identifying the selected block is output.

21. The block management method according to claim 19, wherein, when the selected block is not in use, contents of the selected block is erased, and the number identifying the selected block is output.

22. The block management method according to claim 19, wherein, when there exists no blocks not in use in the group of the blocks with a wear level less than the predetermined wear level limit threshold value, but there exists blocks not in use in a group of blocks with a wear level greater than or equal to the predetermined wear level limit threshold value, and there exists blocks in use in the group of the blocks with a wear level less than the predetermined wear level limit threshold value, a block with a lowest number of erasures from blocks registered in the group of the blocks with a wear level less than the predetermined wear level limit threshold value is selected, and a block number identifying the selected block is output.

23. The block management method according to claim 22, wherein contents of the selected block is copied to a block with a lowest number of erasures among the blocks not in use in the group of the blocks with a wear level greater than or equal to the predetermined wear level limit threshold value, erases the selected block, and outputs a block number of the selected block is output.

24. The block management method according to claim 19, wherein, if there exists no blocks not in use, but there exists blocks in use in the group of the blocks with a wear level less than the predetermined wear level limit threshold value, and there exists blocks not in use in a group of blocks with a wear level greater than or equal to the predetermined wear level limit threshold value, a block with a lowest number of erasures is selected from blocks not in use registered in the group of the blocks with a wear level greater than or equal to the predetermined wear level limit threshold value, and outputs a block number identifying the selected block is output.

25. The block management method according to claim 24, wherein the selected block is erased and a number identifying the selected block is output.

26. The block management method according to claim 19, wherein, when a block with a specific wear level in a specific group is requested, a block number identifying a selected block with the specific wear level is output, and a wear level in the specific group is rearranged to take into account absence of the selected block.

27. The block management method according to claim 26, wherein the managing comprises setting in each block, a forward pointer indicating a block with a next higher wear level and a backward pointer indicating a block with a next lower wear level, and
when a block with a highest wear level is requested, the forward pointer and the backward pointer of a block with a second highest wear level are changed to take into account absence of the selected block.

28. The block management method according to claim 26, wherein a forward pointer indicating a block with a next higher wear level and a backward pointer indicating a block with a next lower wear level are set for each block, and
when a block with a lowest wear level is requested, the forward pointer and the backward pointer of a block with a second lowest wear level are changed to take into account absence of the selected block.

29. The block management method according to claim 26, wherein for each block in a group a forward pointer is set indicating a block with a next higher wear level and a backward pointer is set indicating a block with a next lower wear level, and
when a block, other than a block with a lowest wear level or a block with a highest wear level, is selected in response to a block request, the backward pointer of a block indicated by the forward pointer of the selected block and the forward pointer of a block indicated by the backward pointer of the selected block are changed appropriately to take into account absence of the selected block.

30. The block management method according to claim 19, wherein, when addition of a block with a specific number of erasures in a specific group is requested, a wear level of the block to be added in the specific group is determined, and that information for the block to be added is taken into account in the specific group.

31. The block management method according to claim 30, wherein managing the blocks in a group comprises:
setting a forward pointer indicating a block with a next higher wear level and setting a backward pointer indicating a block with a next lower wear level for each block in a group; and
determining whether the wear level of the block to be added is a lowest level, and if so, setting the backward pointer of a block with a lowest wear level before the addition to indicate the block to be added, and setting the forward pointer and the backward pointer of the block to be added to indicate the block with a next higher wear level and a next lower wear level, respectively.

32. The block management method according to claim 31, wherein managing the blocks in a group comprises:
determining a maximum number of erasures of each group and differences in a number of erasures with respect to an adjacent block in a wear level order in each group; and
determining that the wear level of the block to be added is a lowest wear level when a difference between a maximum number of erasures of the specific block and a total sum of the differences in the number of erasures is larger than a number of erasures of the requested block.

33. The block management method according to claim 30, wherein managing the blocks in a group comprises:
setting a forward pointer indicating a block with a next higher wear level and setting a backward pointer indicating a block with a next lower wear level for each block registered in each group; and
determining whether the wear level of the block to be added is a highest level, and if so, setting the forward pointer of a block with a highest wear level before the addition is performed to indicate the block to be added, and setting the forward pointer and the backward pointer of the block to be added to indicate the block with a next higher wear level and a next lower wear level, respectively.

34. The block management method according to claim 33, wherein managing the blocks in a group comprises:
determining a maximum number of erasures of each group and differences of a number of erasures with respect to an adjacent block in a wear level order in each group; and
determining that the wear level of the block to be added is a highest wear level when a difference between a maximum number of erasures of the specific block and a total sum of the differences in the number of erasures is substantially equal to or less than a number of erasures of the requested block, and the maximum number of erasures of the specific block is less than a number of erasures of the requested block.

35. The block management method according to claim 30, wherein managing the blocks in a group comprises:
setting the forward pointer indicating a block with a next higher wear level higher and setting the backward pointer indicating a block with a next lower wear level;
searching in the specific group, when it is determined that the wear level of the block to be added is not a highest wear level and is not a lowest wear level, for an appropriate position to add the block to be added;
setting appropriately the forward pointer and the backward pointer of two blocks adjacent to the block to be added in a wear level order; and
setting appropriately the forward pointer and the backward pointer of the block to be added to indicate the block with a next higher wear level and a next lower wear level, respectively.

36. The block management method according to claim 35, wherein managing the blocks in a group comprises:
determining a maximum number of erasures of each group and differences in a number of erasures with respect to an adjacent block in a wear level order in each group; and
determining that the wear level of the block to be added is not a highest level and not a lowest level when a difference between a maximum number of erasures of the specific block and a total sum of the differences in the number of erasures is less than a number of erasures of the block to be added, and the maximum number of erasures of the specific block is larger than a number of erasures of the block to be added.

37. The block management method according to claim 35, wherein managing the blocks in a group comprises:

changing the forward pointer and the backward pointer of two blocks adjacent to the block to be added in the wear level order by setting the backward pointer of a block with a next higher wear level than the block to be added to indicate the block to be added, and setting a forward pointer of a block with a next lower wear level than the block to be added to indicate the block to be added.

* * * * *